US006971470B2

(12) United States Patent
McGoldrick

(10) Patent No.: US 6,971,470 B2
(45) Date of Patent: Dec. 6, 2005

(54) CONTROL SYSTEM FOR MATERIAL HANDLING VEHICLE WITH DUAL CONTROL HANDLES

(75) Inventor: Kevin McGoldrick, Binghamton, NY (US)

(73) Assignee: The Raymond Corporation, Greene, NY (US)

( * ) Notice: Subject to any disclaimer, the term of this patent is extended or adjusted under 35 U.S.C. 154(b) by 263 days.

(21) Appl. No.: 10/631,137

(22) Filed: Jul. 31, 2003

(65) Prior Publication Data

US 2005/0023066 A1 Feb. 3, 2005

(51) Int. Cl.[7] ........................ B60K 26/00; B60R 25/10; B62D 1/22

(52) U.S. Cl. ...................................... 180/321; 280/778

(58) Field of Search ................................ 180/321–325; 280/778, 93.502; 74/479.01, 557; 187/222; 701/50; 340/825.69, 825.72

(56) References Cited

U.S. PATENT DOCUMENTS 2,593,643 A * 4/1952 Woolf ........................ 200/518
4,216,847 A 8/1980 Jalbert et al.
4,350,972 A 9/1982 Perry
4,437,094 A 3/1984 Fish
5,251,722 A * 10/1993 Scratchard .................. 180/321
5,455,762 A 10/1995 Braun
5,515,282 A 5/1996 Jackson
6,216,196 B1 4/2001 Elwell et al.
6,564,906 B1 * 5/2003 Haack et al. ............... 187/222
6,679,349 B1 * 1/2004 Pollish, Jr. .................. 180/326

* cited by examiner

*Primary Examiner*—Paul N. Dickson
*Assistant Examiner*—Laura B. Rosenberg
(74) *Attorney, Agent, or Firm*—Quarles & Brady LLP

(57) ABSTRACT

A material handling vehicle includes first and second control handles positioned at opposing ends of an operator compartment. The control system receives inputs from each of the first and second control handles and determines an appropriate travel direction and speed based on those inputs. In a normal mode, one of the handles is in the neutral state, and the input of the second handle is therefore used to direct motion of the truck. In a conflict state, each of the first and second control handles is providing a non-neutral travel request, and the control system determines an appropriate travel direction and speed based on a most conservative choice algorithm.

25 Claims, 9 Drawing Sheets

CONTROL SYSTEM FOR MATERIAL HANDLING VEHICLE WITH DUAL CONTROL HANDLES

BACKGROUND OF THE INVENTION

The present invention relates to material handling vehicles, and more particularly to a control system for a material handling vehicle which can be operated from a variety of operator orientations.

Material handling vehicles commonly found in warehouse and factory environments include, for example, vehicles in which the operator normally stands on a platform at the rear of the truck, at the end opposite of a load carrying or load handling mechanism, typically employing forks to lift and transport material. To provide an efficient flow of goods in such facilities, operators of these vehicles typically orient their bodies in the most comfortable position for adequate visibility to drive the material handling vehicles in both a forks first direction, with the vehicle forks leading in the direction of travel, and tractor first direction, in which the vehicle forks trail in the direction of travel.

Although in a typical vehicle there are a variety of possible operator orientations, when traveling, an operator will favor positions that maximize comfort and visibility for forks first and tractor first travel. Generally, one operator orientation is used more frequently than the others. The prevalent orientation varies with vehicle design, from facility to facility, within a given facility, and even from operator to operator. There is, therefore, a fundamental need to provide stability to the operator when traveling for all likely orientations, while maintaining operator comfort and the maximum productivity potential of the vehicle.

For these reasons, designers of lift trucks have developed a number of different operator compartment configurations. Available configurations include both standing and seated configurations in which the operator faces either generally to one side or to the front/rear of the truck. Vehicles designed for a standing operator (stand-up vehicles), include both side stance configurations where the operator generally operates the truck when standing facing the left side of the truck and, fore/aft configurations in which the operator may either stand facing the load or away from the load. For each of these configurations, designers have further provided various methods to accommodate operator stability for travel in both the forks first and tractor first directions, and to provide each design with a reasonable degree of comfort for the operator, while ensuring the capability for vehicle productivity. Stand-up vehicle designs, for example, typically impart stability, in part, through hand operated vehicle controls that provide both stability and the means to control the operation of the vehicle. Operator stability when traveling is accomplished through a combination of solid footing, pads and covers that embrace portions of the operators body, hands on the vehicle controls and an operator advanced knowledge of the commanded vehicle motions.

Typical prior art stand-up vehicles utilize the same control elements to command travel in either direction and for either stance orientation. That is, the truck operator manipulates the same steering device, travel control, and deadman foot control regardless of stance orientation. In the case of stand-up trucks configured in the fore/aft sense, although designed to be intuitive for bi-directional control, some operators nonetheless find the controls more convenient for forks first travel than for tractor first travel. Furthermore, these controls often do not provide maximum comfort for the widest possible range of operator sizes, as the operator must reach beside and slightly rearward of his or her centerline in order to control the vehicle travel speed when driving and facing in the tractor first direction.

To provide an operator-friendly system, it is therefore desirable to provide a material handling vehicle which includes a control handle for driving when facing the forks, (the fore direction), and a second control handle for driving when facing away from the forks, (the aft direction). A material handling vehicle constructed in this way allows an operator to face in the direction of travel, irrespective of the selected direction, and to comfortably operate a control handle which provides intuitive directional control.

BRIEF SUMMARY OF THE INVENTION

In one aspect, the present invention is a method for controlling a material handling vehicle having a first and a second control handle. A control signal from each of the first and second control handles is monitored to determine whether the control handle is in a neutral position or a non-neutral position, and a requested direction of travel and a requested speed is determined for each control handle in a non-neutral position. When one of the first and second control handles is in the non-neutral position and the other of the first and second control handles is in the neutral position, the vehicle is driven in the selected direction and at the selected speed. When both the first and the second control handles are in the non-neutral position, the vehicle is driven to a stopped state.

In another aspect, the invention is a method for resolving conflicting inputs from each of a first and a second control handle in a material handling vehicle in which a first input command is monitored for a first speed and direction of travel, and a second input command is monitored for a second speed and direction of travel. The actual direction of motion and actual speed of the vehicle are also monitored, and each of the first and second command signals are categorized as one of a drive request, a plug request, or a neutral request. When one of the first and second control signals is a neutral request and the other is one of a drive request or a plug request, the material handling vehicle is commanded to follow the command of the other control handle. When each of the first and the second control signals is a drive request, the material handling vehicle is commanded to drive at the lower of the first and second speed commands until either of the control signals is changed to a plug request or a neutral request and the material handling vehicle is then coasted to a stopped state. When neither of the first and second control signals is a neutral request and at least one of the first and second control signals is a plug request, the material handling vehicle is slowed to the stopped state.

In yet another aspect, the present invention provides a method for controlling a material handling vehicle having a first and a second control handle for use when traveling in the fore and aft directions, respectively. A first travel request signal from the first control handle and a second travel request signal from the second control handle are each monitored. The first and second travel requests are compared to a neutral position to determine whether each of the first and second travel request signals is in the neutral position or a non-neutral position. When one of the first and second control signals is in the neutral position and the other is in the non-neutral position, the vehicle is operated in a normal mode wherein the vehicle follows the travel request command of the other control signal. When neither of the first and second control signals is in the neutral position, the vehicle is operated in a conflict mode wherein the vehicle is brought to a stopped state, and is held in the stopped state until each of the first and second control signals are returned to the neutral position while the vehicle is in the stopped state.

In still another aspect, a material handling vehicle is provided. The material handling vehicle comprises an operator compartment, a first control handle mounted to the operator compartment for access by an operator facing a first direction for producing a first travel request control signal, a second control handle mounted to the operator compartment for access by an operator facing a second direction for producing a second travel request control signal. The material handling vehicle further comprises a traction control system for driving the material handling vehicle in a selected direction and at a selected speed, and a vehicle control system for receiving the first and second travel request control signals. The vehicle control system evaluates the first and second travel request control signals, determines whether a conflict exists between the first and second travel request control signals, and commands the traction control system to bring the vehicle to a stopped state when the conflict exists.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE INVENTION

Figure 1:
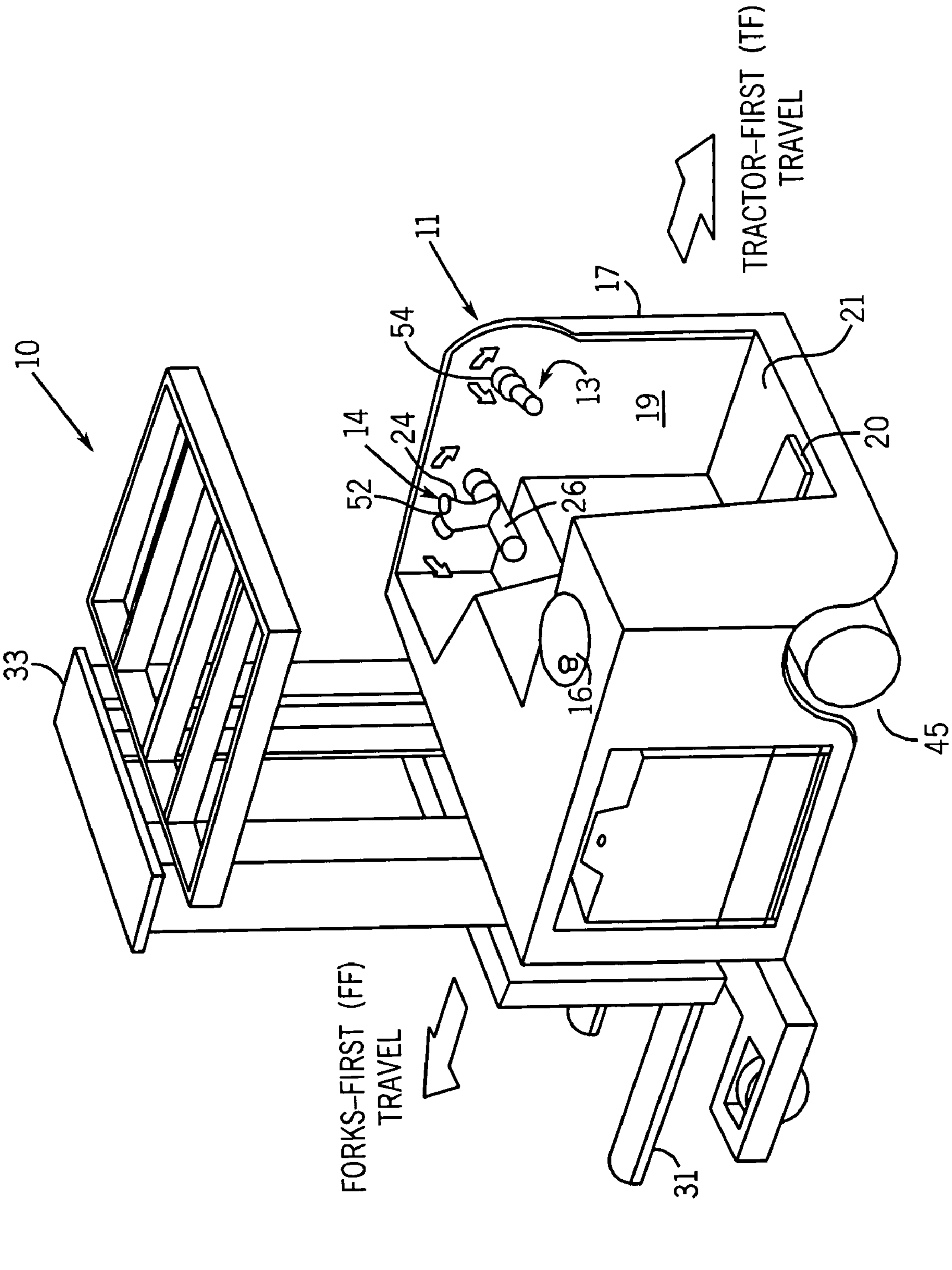
FIG. 1 is a perspective of a material handling vehicle constructed in accordance with the present invention.

Referring now to the Figures, and more particularly to FIG. 1, a material handling vehicle constructed in accordance with the present invention is shown. The material handling vehicle as shown is a stand-up, fore-aft stance configured lift truck 10 designed to allow the operator to operate the vehicle from different operator orientations. Here, the operator can stand facing in the direction of travel, whether travel be in the Forks First or Tractor First direction. The truck 10 includes an operator compartment 11 comprising an enclosure 17 with an opening 19 for entry and exit of the operator.

The compartment 11 includes a first multi-function control handle 14 which is mounted to the enclosure 17 at the front of the operator compartment 11 proximate the forks 31, an aft control handle 13 positioned at the back of the compartment 11, and a floor switch 20 positioned on the floor 21 of the compartment 11 in a location selected to allow the operator to easily access the floor switch 20 when facing either the fore or aft directions. A steering wheel 16 is also provided in the compartment 11 and, like the floor switch, is positioned to allow control by the operator when facing either the fore or aft directions. The position of multi-function control handle 14 is selected to control the speed and direction of travel of the lift truck 10 when the operator is facing the forks 31, and the position of aft control handle 13 is selected to control the motion of the lift truck 10 when the operator is facing in the aft direction, as described more fully below.

Figure 2:
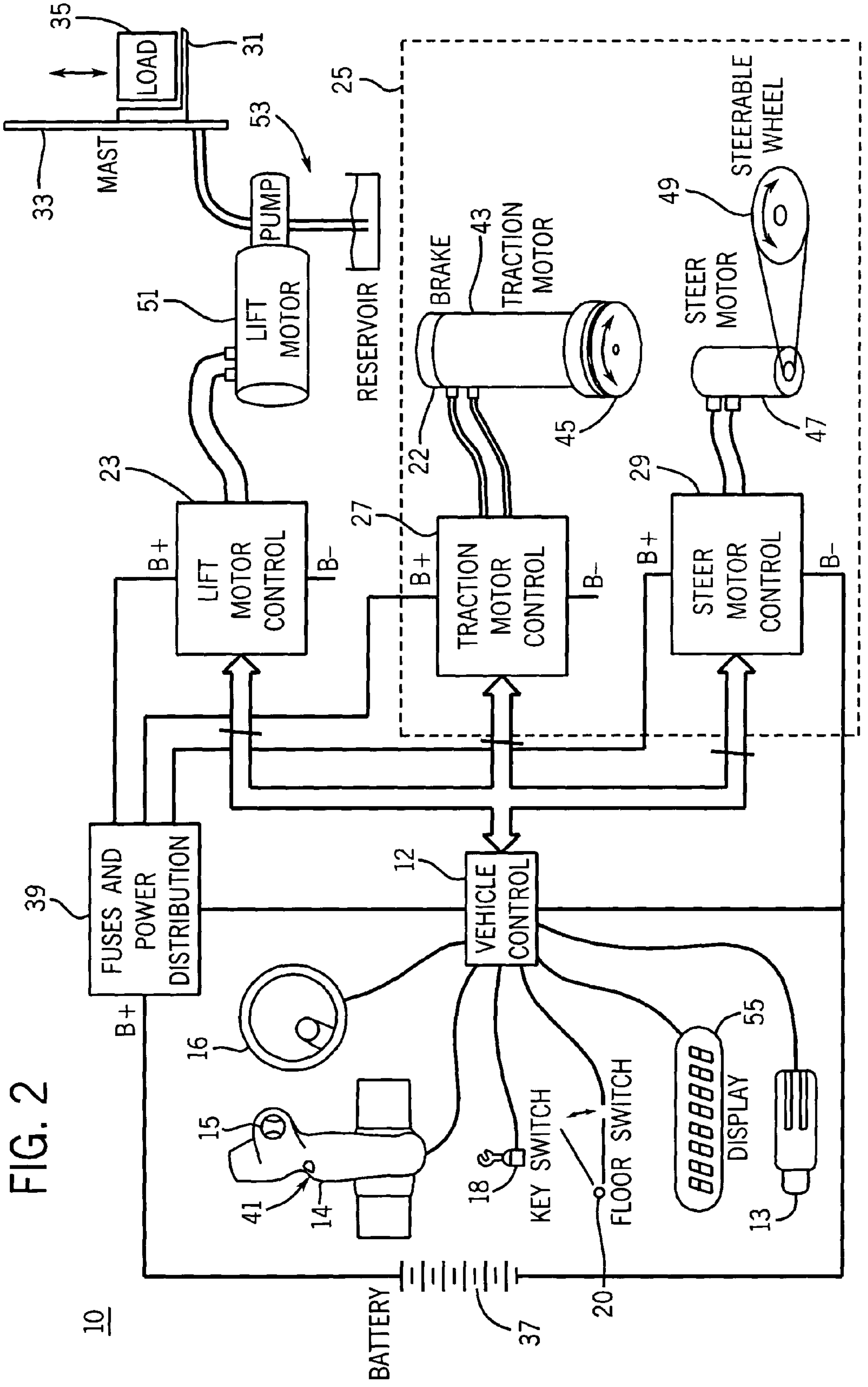
FIG. 2 is a block diagram of the lift truck constructed in accordance with the present invention.

Referring now to FIG. 2, a block diagram of a typical lift truck 10 in which the present invention can be provided is illustrated. The lift truck 10 comprises a vehicle control system 12 which receives operator input signals from the aft control handle 13, the multi-function control handle 14, the steer wheel 16, a key switch 18, and the floor switch 20 and, based on the received signals, provides command signals to each of a lift motor control 23 and a drive system 25 including both a traction motor control 27 and a steer motor control 29. The drive system 25 provides a motive force for driving and steering the lift truck 10 in a selected direction, while the lift motor control 23 drives forks 31 along a mast 33 to raise or lower a load 35, as described below. The lift truck 10 and vehicle control system 12 are powered by one or more battery 37, coupled to the vehicle control system 12, drive system 25, and lift motor control 23 through a bank of fuses or circuit breakers 39.

As noted above the operator inputs include a key switch 18, floor switch 20, steering wheel 16, a multi-function control handle 14, and an aft control handle 13. The key switch 18 is activated to apply power to the vehicle control system 12, thereby enabling the lift truck 10. The floor switch 20 provides a deadman braking device, disabling motion of the vehicle unless the floor switch 20 is activated by the operator, as described below.

Figure 3:
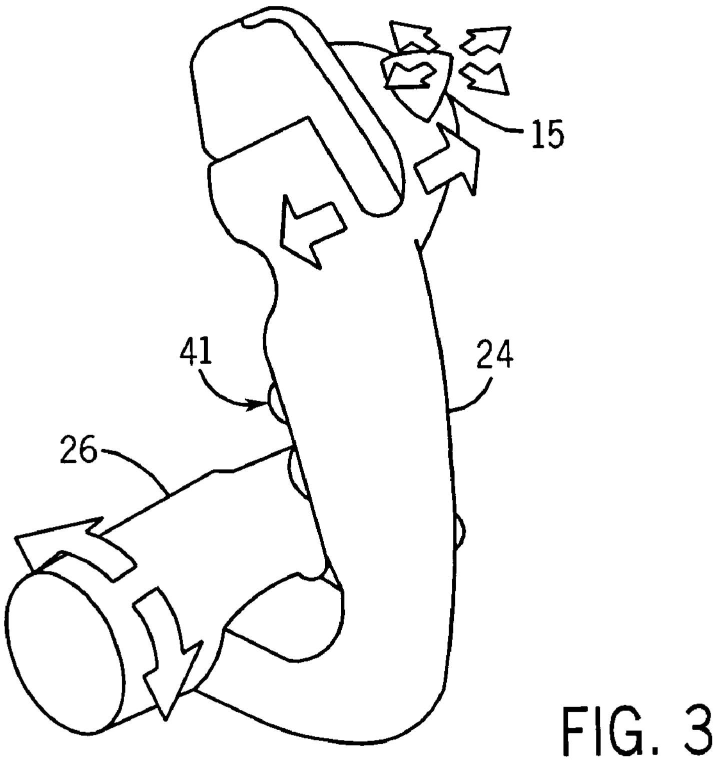
FIG. 3 is a perspective view of a multi-function control handle of FIGS. 1 and 2.

Referring now also to FIGS. 1 and 3, the control handle 14 is a multi-function control which includes both an upright, substantially vertical section 24, and a horizontal section 26, the vertical 24 and horizontal 26 sections together providing a number of control functions for the lift truck 10. The horizontal section 26 includes a transducer such as a potentiometer which provides a travel direction and speed command to the vehicle control system 12 and is configured to provide intuitive control for an operator facing the fore of the vehicle 10. The horizontal section 26 is rotated forward from a neutral position 52 towards the forks 31 of the vehicle 10 to provide a forks first directional and speed command and backwards away from the neutral position 52 and away from the forks 31 to provide a tractor first directional and speed signal to the vehicle control 12, the final speed of travel being determined in both cases based on the degree of rotation. When in the neutral position 52, the control handle 14 requests a speed of zero in the selected direction.

The vertical section 24 includes a four-way switch 15 located on the top of the handle 14 which provides a tilt up/down function when activated in the forward and reverse directions and a sideshift right and left function when activated to the right and left directions. A plurality of control actuators 41 located on the vertical section of the handle 14 provide a number of additional functions, and can include, for example, a reach push button, a retract push button, and a horn push button. The vertical section 24 further includes a transducer such as a potentiometer providing a lift function control signal to the vehicle control system 12. A number of other functions could also be provided, depending on the construction and intended use of the lift truck 10.

Figure 4:
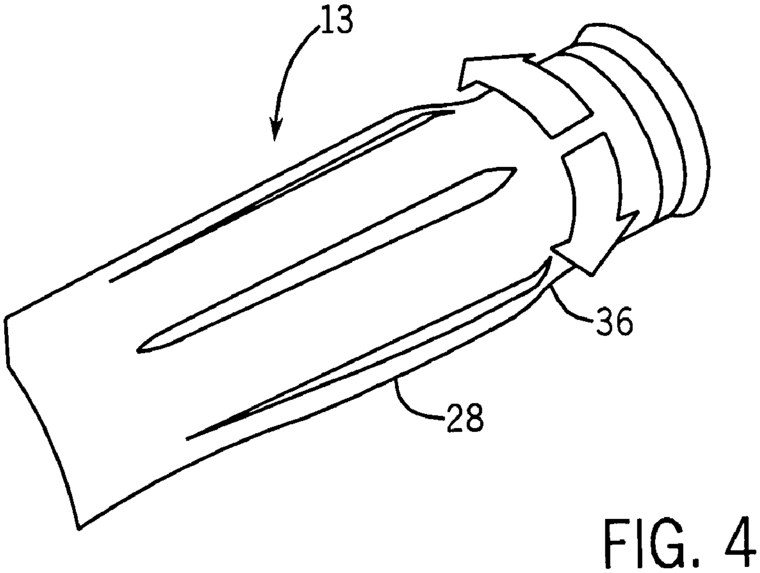
FIG. 4 is a perspective view of an aft control handle of FIGS. 1 and 2.

Referring now to FIGS. 1, 2, and 4, the aft control handle 13 is a horizontally mounted handle which includes a transducer for providing directional and speed control signals to the vehicle control system 12, as described with reference to the horizontal section of the control 14 described above. The aft control handle 13 is configured to operate intuitively, and similarly to the control handle 14, for an operator facing the aft of the vehicle. The aft control handle 13 is rotated out of the neutral position 54 forward toward the back of the lift truck 10 to provide a tractor first directional signal and speed command, and in the opposite direction, toward the fore of the vehicle, to provide a forks first directional and speed command. Therefore, irrespective of the direction that the operator is facing, a control handle with intuitive operation is provided. When facing either direction, a control is provided which is rotatable in the direction that the operator is facing to cause the lift truck 10 to move in that direction, and which is also rotatable in the opposite direction to cause the lift truck 10 to move in the opposite direction. As described above, the speed request signal provided by the aft control handle 13 is a function of the amount of rotation in a given direction.

Referring again to FIG. 2, as shown, the vehicle control system 12 receives a control signal from at least one of the control handle 14 and aft handle 13 and transmits the control signal to traction motor control 27. Traction motor control 27 activates the traction motor 43 which is connected to wheel 45 to provide motive force to the lift truck 10. The speed and direction of the traction motor 43 and associated wheel is selected by the operator from the control handle 14 or aft control handle 13, each of which can provide a control signal to the vehicle control system 12. As the control handle 13 or 14 is rotated, the vehicle control system 12 evaluates the applied control signal or signals and determines the selected direction and speed of travel, as described below.

Speed of the lift truck 10 is typically monitored and controlled through an encoder or other feedback device (not shown) coupled to the traction motor 43. The wheel 45 is also connected to friction brake 22 through the drive motor, providing both a service and parking brake function for the lift truck 10. The friction brake 22 is typically spring-applied, and defaults to a "brake on" position. The operator must stand on the deadman pedal, actuating floor switch 20, for the brake to be released. The traction motor 43 is typically an electric motor, and the associated friction brakes 22 can be either an electrically or a hydraulically released device. Although one friction brake 22, traction motor 43, and wheel 45 are shown, the lift truck 10 can include one or more of these elements.

The steer motor control 29 is connected to drive a steer motor 47 and associated steerable wheel 49, steered in a direction selected by the operator by rotating the steering wheel 16, described above. The direction of rotation of the steerable wheel 49 and the travel control command from control handle 13 or 14 determine the direction of motion of the lift truck.

The lift motor control 23 provides command signals to control a lift motor 51 which is connected to a hydraulic circuit 53 for driving the forks 31 along the mast 33, thereby moving the load 35 up or down, depending on the direction selected at the multi-function control handle 14. In some applications, the mast 33 can be a telescoping mast. Here, additional hydraulic circuitry can be included to raise or lower the mast 33 as well as the forks 31.

In addition to providing control signals to the drive system and lift control system, the vehicle control 12 can also supply data to a display 55 for providing information to the operator. Displayed information can include, for example, a weight of a load placed on the forks 31, the speed of the vehicle, the time of day, or the state of charge of the battery.

Referring again to FIG. 2, as described above, the vehicle control system 12 receives a control signal input from each of the control handles 13 and 14, as well as from the floor switch 20. In typical operation, one of the control handles 13 and 14 will be in the neutral position, and the other of the control handles 13 and 14 will provide a speed and directional control signal to the vehicle control system 12. However, the vehicle control system 12 must also account for the case in which a non-neutral control signal is received from both of the control handles 13 and 14, a situation which will be described hereafter as a "conflict mode". Whenever the lift truck 10 is in a conflict mode, the vehicle control system 12 evaluates the input signals with reference to feedback information regarding the actual speed and direction of motion of the vehicle 10 and controls the traction system 27 based on a "most conservative" command algorithm as described below. During operation of the lift truck 10, a sequencing is instituted between interpreting one of the control handles 13 and 14 and the other of the control handles 13 and 14 such that simultaneous rotation of the handles 13 and 14 is interpreted by the vehicle control system 12 as a sequential change, and control decisions are made accordingly. Furthermore, no change in state is provided for a request from one handle 13 or 14, when the other handle 13 or 14 is non-neutral, until after a predetermined delay period elapses. The delay period is typically in the 100 millisecond range, and is selected to filter spurious inputs before a conflict is declared. Furthermore, activation of the floor switch 20, irrespective of the state of the control handles 13 and 14, will lead to the activation of a braking sequence. The floor switch 20, therefore, acts as an override to all motion requests.

Figure 7:
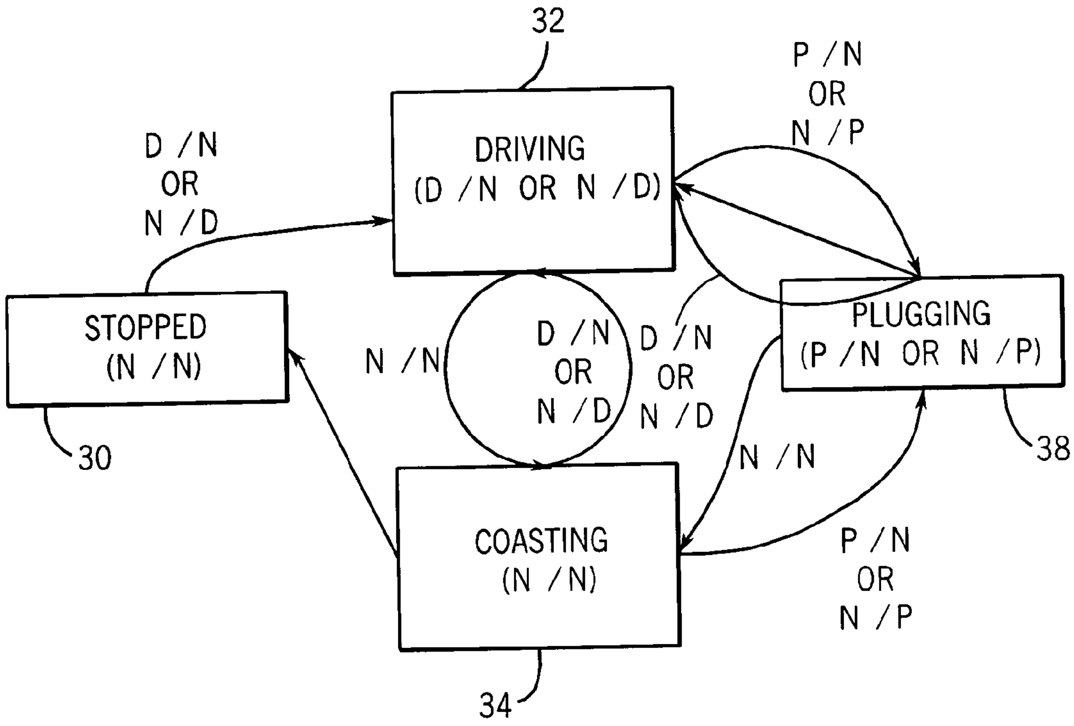
FIG. 7 is a state diagram illustrating normal mode operation of the lift truck of FIG. 1.

Referring now to FIG. 7, a state diagram for operation of the lift truck 10 in a normal mode when no conflicts exist is shown. Here, at least one of the control handles 13 and 14 is in the neutral position at all times, and the lift truck 10 receives control signals from the control handle 13 or 14 which is not in the neutral position, referred to hereafter as the "active handle". Operation of the vehicle with this handle is the same as a lift truck with only a single control handle. Throughout operation in the normal mode, as long as either handle is in neutral and the other is forwarding a non-neutral command signal, the lift truck 10 will follow the non-neutral signal unless the conflict mode has been entered, as described below.

In normal mode operations, four possible states exist: a stopped state 30, a driving state 32, a coasting state 34, and a plugging state 38. As used here, plugging means any driving force applied by the traction motor in the direction opposite of current travel direction. In this state, a speed command provides a selected deceleration rate. In the stopped state 30, each of the control handles 13 and 14 are in the neutral position, feedback indicates that the lift truck 10 is not moving, and therefore that the speed of the lift truck 10 is zero. In this state, no directional or speed command is forwarded to the traction control system 27. In the driving state 32, one of the control handles 13 or 14 is moved out of the neutral position to become the active handle and has requested motion in a selected direction. In this state, a control signal providing a directional and speed command is transmitted to the traction control system 27, effecting movement of the vehicle in the selected direction and at the selected speed. In the coasting state 34, both of the control handles 13 and 14 are again in the neutral position, but feedback indicates that the lift truck 10 is still moving. Here, the speed command to the traction control 27 is dropped to zero, and the lift truck 10 is allowed to coast to a stop. In the plugging state 38, one of the control handles 13 and 14 has been moved out of the neutral position, requesting a travel direction opposite to the direction of the lift truck 10 as determined from feedback. The plugging state 38 is a request to slow or stop the vehicle, and the traction control system 27 activates the traction motor in the direction selected, opposite the direction of motion of the lift truck 10, and at the selected speed to slow the lift truck 10 and to bring it to a stop more quickly than from the coasting state 34.

Referring still to FIG. 7, the state diagram illustrates transitions between the states described above. The lift truck 10 is always started from the stopped state 30, in which both control handles 13 and 14 are in a neutral position. In the figures, this state is marked as "N/N", for neutral/neutral. As shown through FIGS. 7–10, N is used to indicate that a control handle is in a neutral position, D to indicate that a drive state 32 is requested, and P to indicate that a plug state 38 has been requested.

Referring still to FIG. 7, from the stopped state 30, if either of the control handles 13 or 14 is moved out of the neutral state to request that the lift truck 10 move, the active state changes from the stopped state 30 to the driving state 32. In the driving state 32, a control signal indicating the direction of travel and the requested speed is transmitted to the traction control system 27, and the lift truck 10 is moved in the requested direction, accelerating to the requested speed. The control handle 13 or 14 providing the drive signal is the active handle which controls motion of the lift truck 10 unless a conflict occurs, as described below.

When in the driving state 32, movement of the active control handle 13 or 14 to the neutral position will cause a transition to the coasting state 34, in which the speed request signal to the traction control system 27 is dropped to zero, allowing the lift truck 10 to coast to a stop. The lift truck 10 transitions from the coast state 34 to the stopped state 30 when speed feedback indicates that the vehicle has stopped. Reversal of the active control handle to request movement in the opposite direction results in a transition to the plugging state 38.

While in the plugging state 38, moving the active control handle back to the neutral position will again cause transition to the coasting state 34, while moving the handle in the drive direction causes the active state to change to the driving state 32. Continuing the active control handle in the plugging state 38, automatically transitions to the driving state 32 when feedback indicates that the speed of the lift truck 10 has dropped to zero. At this point the direction of motion of the lift truck 10 is reversed.

From the coasting state 34, if the active control is moved out of the neutral position, the state can change from coasting 34 back to the driving state 32 or, if a reversal in the direction of motion is received, to the plugging state 38. As described above, the lift truck 10 enters the stopped state 30 only when the speed of the vehicle, as determined from feedback, drops to zero while both handles are in the neutral position. The stopped state 30 therefore cannot be entered unless both of the control handles 13 and 14 are in the neutral position, as described below.

Figure 8:
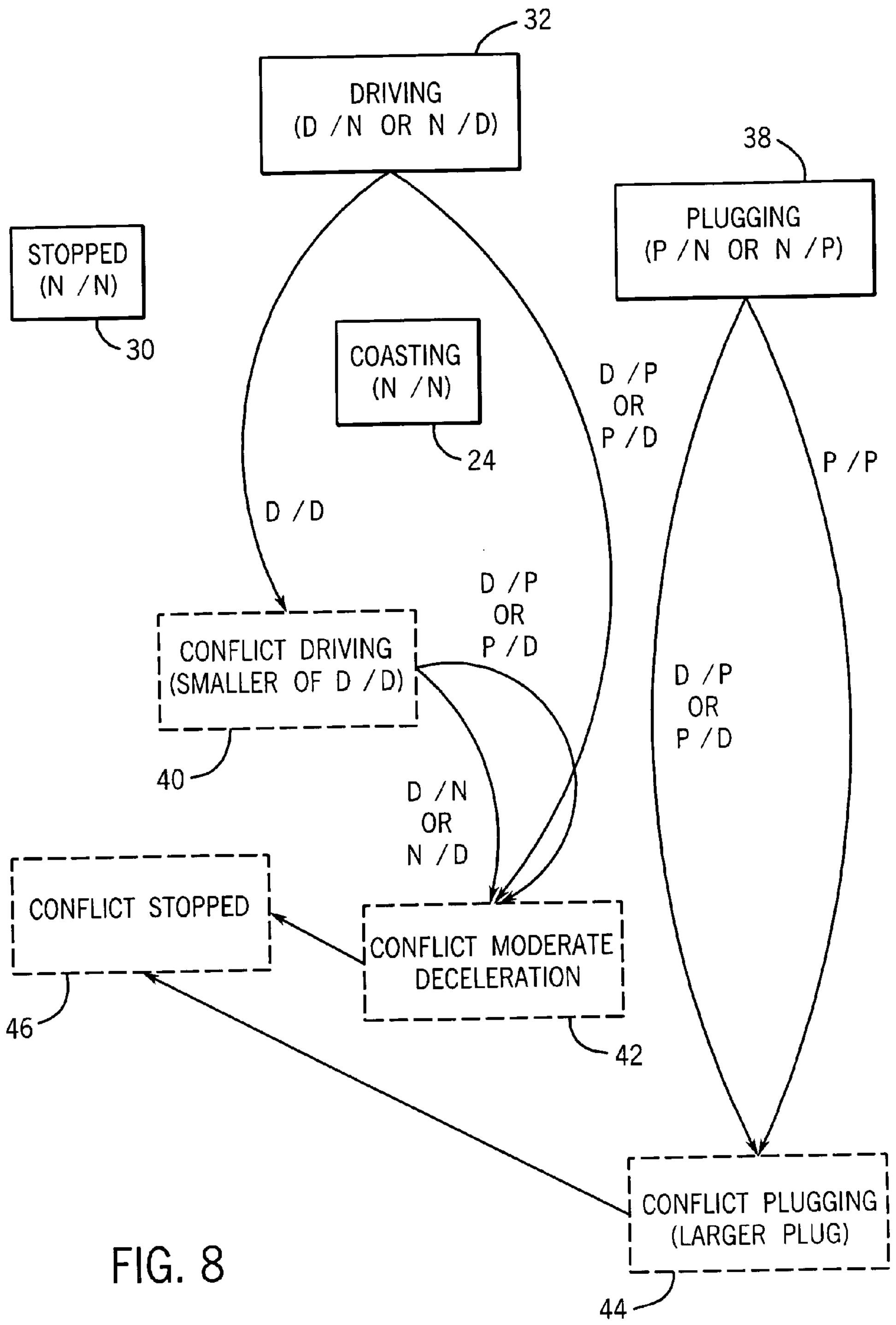
FIG. 8 is a state diagram illustrating conflict mode operation of the lift truck of FIG. 1.

As described above, the lift truck 10 operates in the normal mode as described with respect to FIG. 7 as long as one of the handles 13 and 14 is active, and the other remains in the neutral position, and therefore, no "conflict" of requests occurs. Referring now to FIG. 8, a state diagram illustrating the detection of and transition to a conflict mode is shown. The conflict mode is entered whenever a non-neutral signal is received from both control handles 13 and 14. When a conflict occurs, the vehicle control system 12 evaluates the selected direction and speed commands, and provides a signal to the traction control system 27 based on a "most conservative action" basis. The most conservative action basis minimizes the speed of the vehicle, either by forcing the lift truck 10 to move at a lower of two possible speeds, or by decelerating the vehicle to a controlled stop.

Referring still to FIG. 8, in the conflict mode, four states are again possible: conflict driving 40, conflict moderate deceleration 42, conflict plugging 44, and conflict stopped 46. In the conflict driving mode 40, the vehicle control system 12 commands the lift truck 10 to continue moving in the selected direction. Here, the vehicle control system 12 minimizes the speed of the lift truck 10 by commanding the traction control system 27 to operate at the slower of two selected speeds. In the conflict moderate deceleration mode 42 and conflict plugging mode 44 the most conservative response is to assume that the operator intends to slow the vehicle, and to slow the vehicle either by plugging the lift truck 10 at a selected rate or allowing it to coast to a stop. Once the lift truck 10 has entered the conflict mode the vehicle control system 12 allows transitions only to states which eventually bring the lift truck 10 to a stop.

Referring again to FIG. 8, a state diagram illustrating entry into the various conflict mode states is shown. The conflict mode can only be entered from the driving state 32 or plugging state 38, as both of the handles 13 and 14 must be activated to enter the conflict mode, and, as noted above, any simultaneous motion of the control handles 13 and 14 is interpreted as sequential motion. When the lift truck 10 is in the driving state 32, movement of the previously neutral, inactive control handle to provide a drive request will cause a transition to the conflict driving state 40. Movement of the previously inactive control to a plug request will result in transition to the conflict moderate deceleration state 42. As described above, in the conflict driving state 40, the vehicle control system 12 operates the lift truck 10 at the lower of the two selected speeds. In the conflict moderate deceleration state 42, the speed command to the lift truck 10 is dropped to zero and the lift truck 10 coasts to a stop. When stopped, as verified by feedback from the lift truck 10, the lift truck enters the conflict stopped state 46.

From the conflict driving state 40, if either of the two control handles 13 or 14 is moved out of the drive mode to provide either a neutral or a plugging request, the lift truck 10 enters the conflict moderate deceleration mode 42, and the lift truck 10 is again coasted to a stop, eventually reaching the conflict stopped state 46 as described above.

From the plugging state 38, a conflict exists when the previously inactive control handle is moved to provide either a drive request or a plug request, either of which results in a transition to the conflict plugging state 44. When in the conflict plugging state 44, with one control requesting drive and the other control requesting plug, the plug request is used as the command to the travel control system. When both controls are requesting plug, the larger of the two plug commands is used as the command to the travel control system, and plugging is continued until the lift truck 10 comes to a stop and enters the conflict stopped state 46, irrespective of whether either control handle 13 or 14 is moved to the neutral state.

Figure 9:
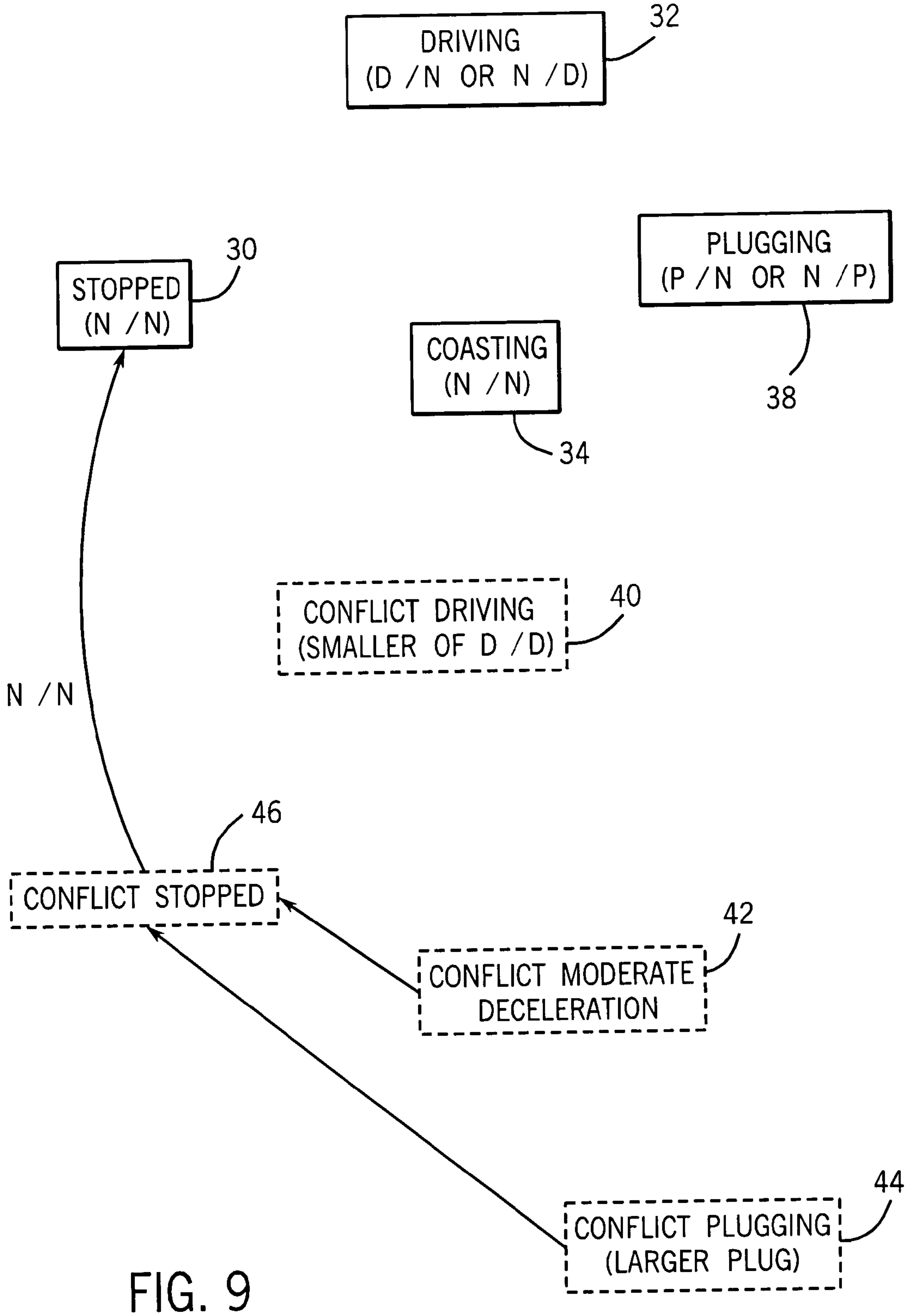
FIG. 9 is a state diagram illustrating clearing a conflict.

Referring now to FIG. 9, a state diagram illustrating the steps required for clearing a conflict and returning to a normal mode of operation after entering the conflict mode are shown. As described above, once a conflict has been detected the lift truck 10 enters one of the conflict driving state 40, conflict moderate deceleration state 42 or conflict plugging state 44. Also as describe above, once the conflict mode is entered, the lift truck 10 must eventually enter the conflict stopped state 46, either directly or through the conflict moderate deceleration state 42. Once the truck 10 is in the conflict stopped state 46, it can only be returned to the normal stopped state 30 by moving both control handles 13 and 14 to the neutral position.

Figure 10:
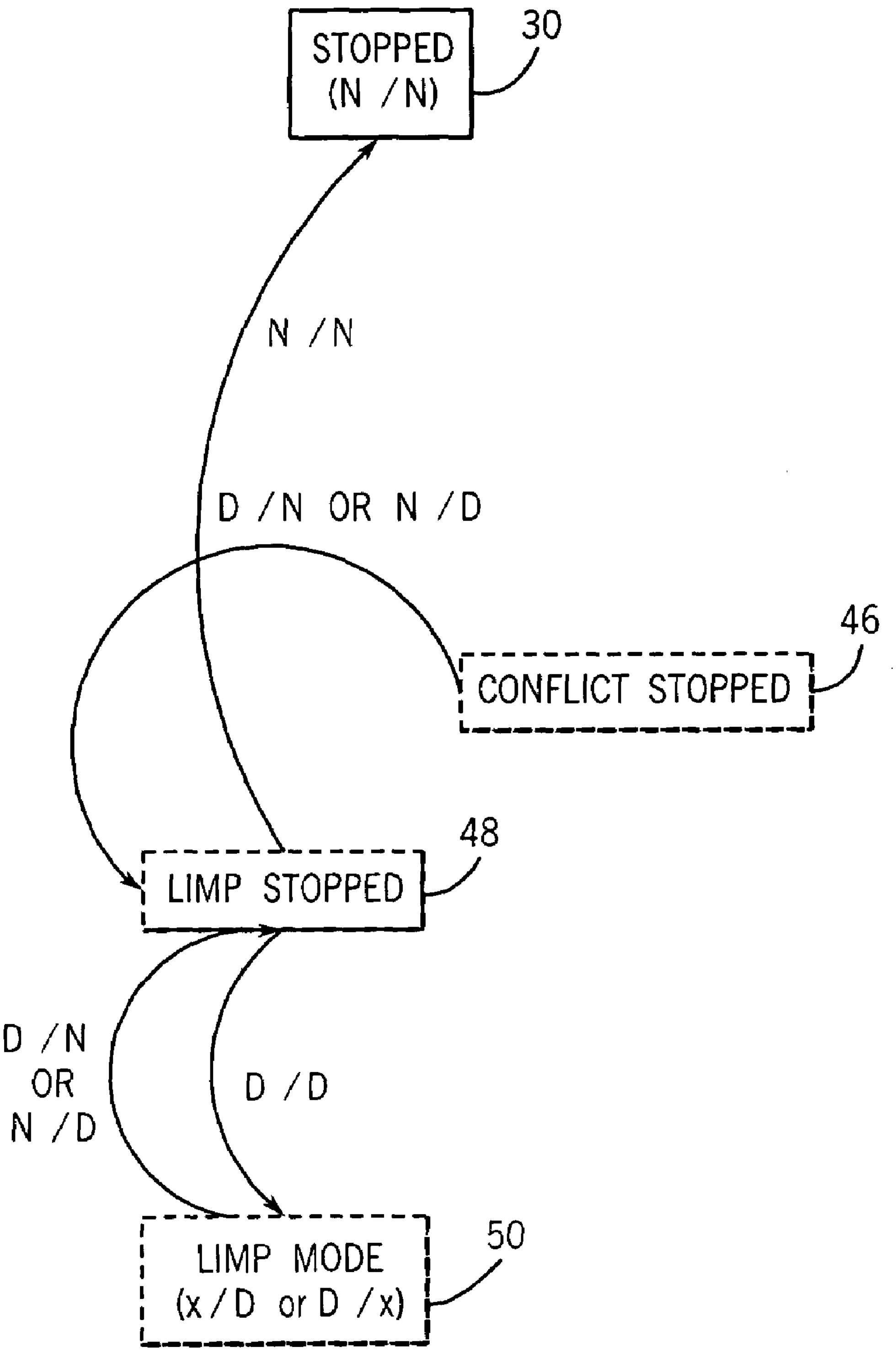
FIG. 10 is a state diagram illustrating limp and operation of the lift truck of FIG. 1.

Referring now to FIG. 10, when in the conflict stopped state 46, the lift truck 10 can be used in a limited "limp" mode. There are two states in the limp mode: the limp stopped state 48 and the limp mode state 50. The lift truck 10 enters the limp stopped state 48 from the conflict stopped state 46 if one, and only one, of the controls 13 and 14 is moved to the neutral state. The control 13 or 14 in the neutral state is then designated the "limp control" and is capable of limited control of the lift truck 10. In the limp stopped state 48, activation of the limp control to provide a travel request signal causes the lift truck to transition to the limp mode state 50, in which the lift truck 10 operates as described with reference to FIG. 7 above, although with the overall speed of the lift truck 10 limited to a selected lower value preferably one mile per hour. With reference to the limp mode state 50 of FIG. 10, the "x" of the term "x/D or D/x" refers to either neutral, drive or plug. To exit the limp mode state 50, the lift truck 10 must be returned to the limp stopped state 50 by moving the limp mode handle back to the neutral position. As described above, to return to the stopped state 30, both handles 13 and 14 must be returned to the neutral position.

Figure 5:
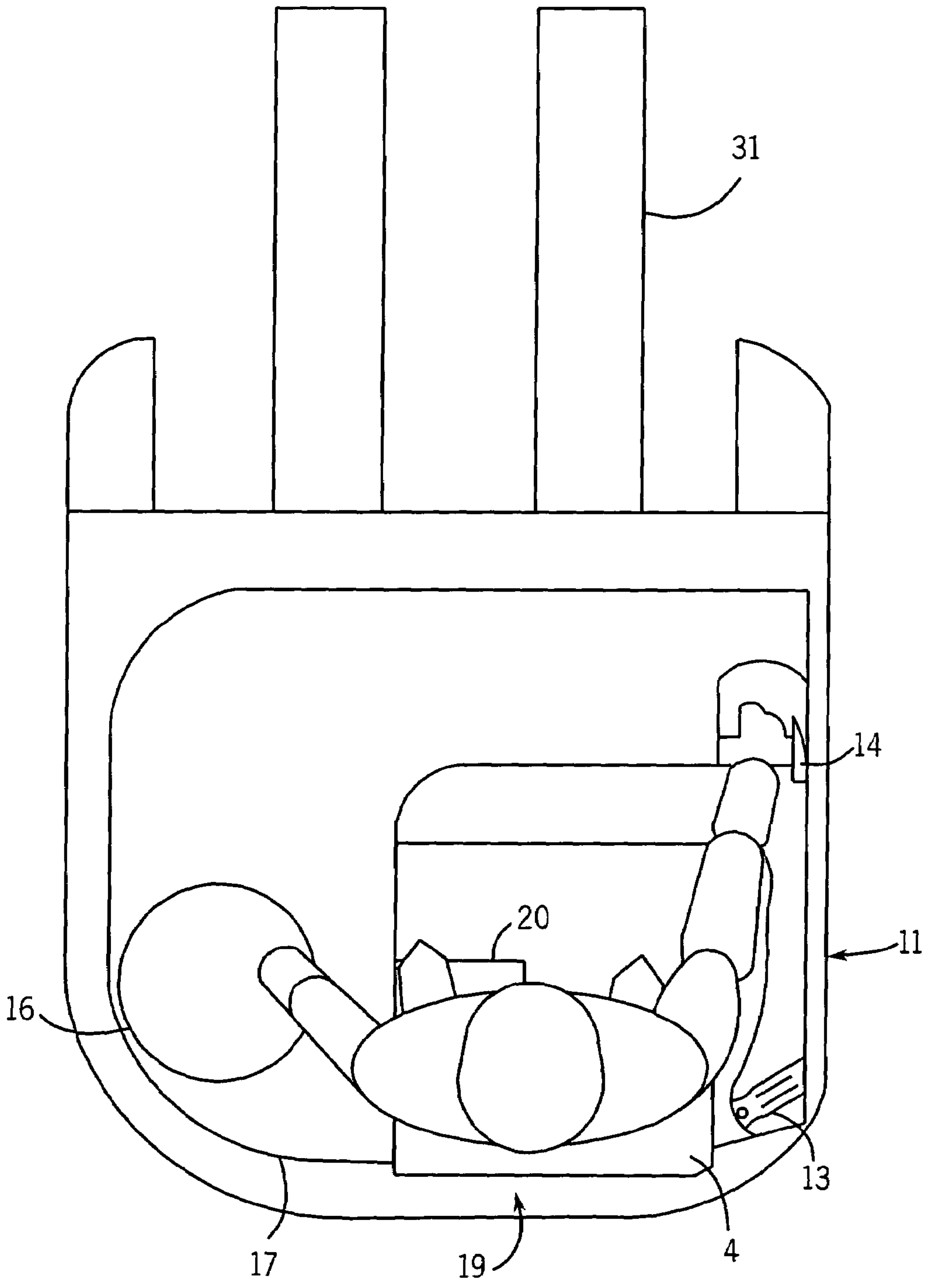
FIG. 5 is a top view of the material handling vehicle with the operator facing fore.

Referring now to FIGS. 1, 4, and 5, as described above, the aft handle 13 is horizontally mounted and is preferably provided as a twist grip style handle having an outer grip 28 constructed of a smooth, comfortable material molded to include recessed grooves 36, which provide a comfortable grip. As described above, operation of the handle is simple and intuitive, allowing rotation in the direction of travel of the operator even when facing aft, as shown.

Figure 6:
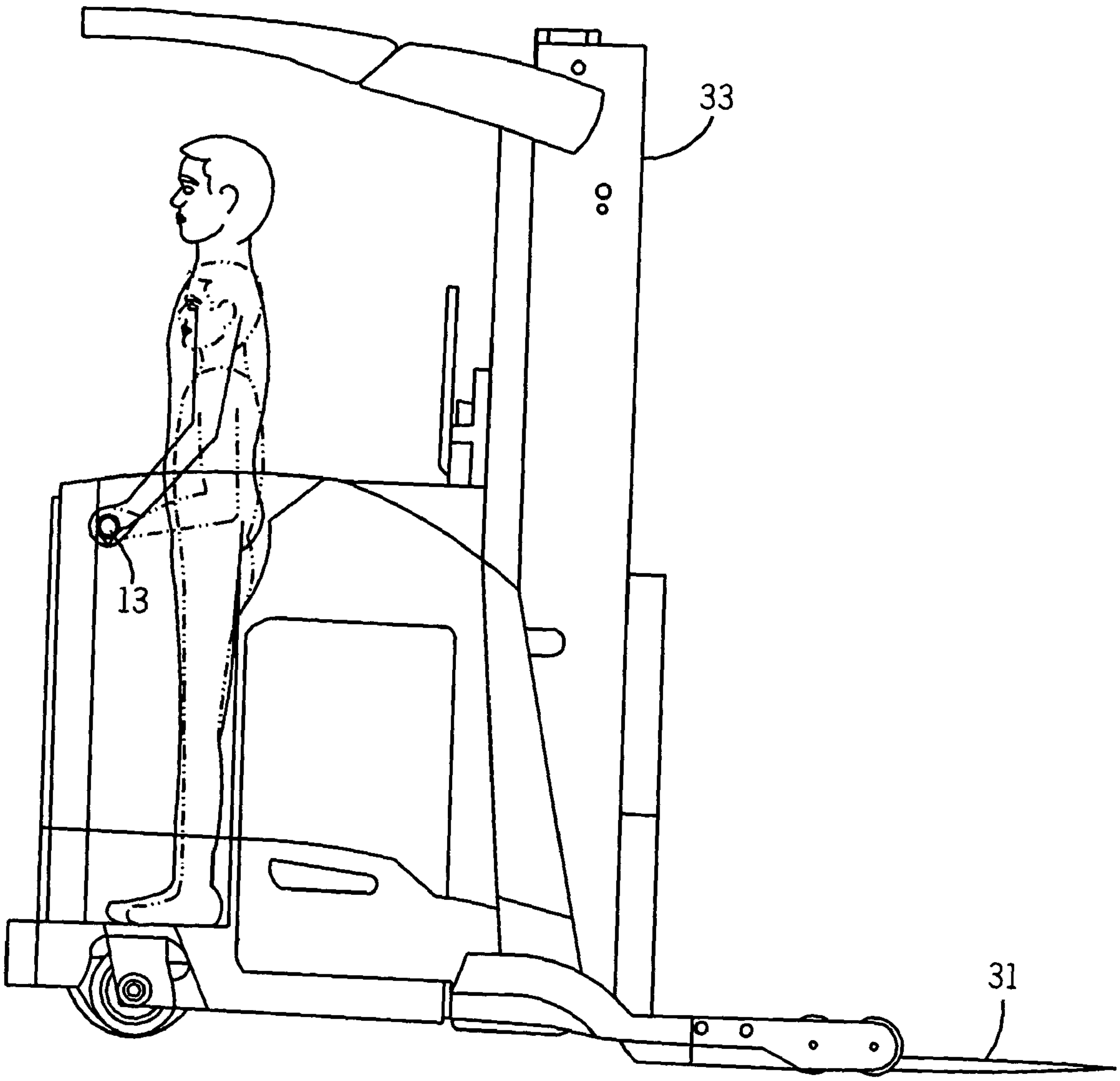
FIG. 6 is a cutaway side view of the material handling vehicle of FIG. 1.

Referring now to FIGS. 1, 5, and 6, in operation, the operator stands in the operator compartment 11 selectively facing either the fore direction (FIG. 5), or the aft direction (FIG. 6). When operating the vehicle while facing in the fore direction, the operator controls the direction and speed of travel with his or her right hand using the multifunction control handle 14, as described above. The deadman brake floor switch 20 provided on the floor of the operator compartment 11 is positioned to be activated or deactivated by the left foot, and the steering wheel 16 is, likewise, operated by the left hand.

Referring now to FIGS. 1 and 6, while facing in the aft direction of the vehicle and particularly for operating the vehicle in the tractor first direction, the operator controls the direction and speed of travel of the vehicle with his or her left hand using the aft control handle 13, and operates the floor switch 20 and steering wheel 16 with the right foot and hand respectively. While facing either the fore or aft directions, therefore, the operator can control the speed and direction of the lift truck 10 with an operator control handle which is positioned to the side and ahead of the operators centerline. This arrangement provides improved ease of control, and further provides stability for the operator, allowing the operator to grip a control handle in the direction the operator is facing. Furthermore, as the operator is not required to reach beside and slightly rearward of his or her centerline when facing in the aft direction to control travel of the vehicle, the operation is certainly more comfortable, which is not only advantageous for the operator, but improves the overall productivity potential of the vehicle by decreasing the need for operator breaks during operation.

Although it is advantageous for the operator to control the travel of lift truck 10 with the multi-function control handle 14 when facing the forks and traveling in the forks first direction and the aft control handle 13 when facing the aft and traveling in the tractor first direction, either control handle 13 or 14 can be used to control the direction and speed of the vehicle in either direction. Typically, however, an operator will elect to control the vehicle with the aft control handle 13 when the lift truck 10 is operated for an extended period of time traveling in the tractor first direction and with the control handle 14 when operating for an extended period of time traveling in the forks first direction and when operating the load handling controls included on multi-function control handle 14. As described above, if the operator moves both of the control handles 13 and 14 to a non-neutral position, the vehicle control system 12 determines an appropriate speed and direction for the lift truck 10, although, after such a conflict exists, the lift truck 10 is always brought to a stop until both handles are returned to the neutral position.

Although the invention has been described with respect to a stand-up, fore-aft configuration vehicle, it will be apparent that the techniques disclosed can be applied to side-stance and seated-operator trucks as well, and nothing disclosed herein should be construed to limit the teaching of the invention to stand-up, fore-aft configuration trucks. Furthermore, while the invention has been described with reference to a lift truck, the invention could be applied to various other types of material handling vehicles. Additionally, although specific control handles and control handle shapes have been described, the size, shape, and orientation of the control handles could be varied without departing from the scope of the invention.

While there has been shown and described what are at present considered the preferred embodiments of the invention, it will be obvious to those skilled in the art that various changes and modifications can be made therein without departing from the scope of the invention defined by the appended claims.

I claim:

1. A material handling vehicle comprising:

an operator compartment;

a first control handle mounted to the operator compartment for access by an operator facing a first direction for producing a first travel request control signal;

a second control handle mounted to the operator compartment for access by an operator facing a second direction for producing a second travel request control signal;

a traction control system for driving the material handling vehicle in a selected direction and at a selected speed; and a vehicle control system for receiving the first and second travel request control signals and for producing and transmitting a directional control signal and a speed control signal to the traction control system, wherein the vehicle control system evaluates the first and second travel request control signals, determines whether a conflict exists between the first and second travel request control signals, and brings the vehicle to a stopped state when the conflict exists.

2. The material handling vehicle as defined in claim 1, wherein the first and second control handles are each rotatable to produce control signals between a neutral and a non-neutral position.

3. The material handling vehicle as defined in claim 2, wherein when one of the first and second control handles is in the neutral position, the vehicle control system commands the vehicle to move in the direction and at the speed of the control signal of the other of the first and second control handles.

4. The material handling vehicle as defined in claim 2, wherein the vehicle control system determines that a conflict exists when neither of the first and second control handles is in the neutral position.

5. The material handling vehicle as defined in claim 1, further comprising a vehicle direction feedback system connected to the vehicle control system.

6. The material handling vehicle as defined in claim 5, wherein the vehicle control system compares the vehicle direction signal to the requested direction of motion and reverses the motor to slow the vehicle when the vehicle direction is opposite of the requested direction.

7. A method for controlling a material handling vehicle having a first and a second control handle, the method comprising the following steps:

a. monitoring a control signal from each of the first and second control handles to determine whether the control handle is in a neutral position or a non-neutral position;

b. determining a requested direction of travel and a requested speed for each control handle in a non-neutral position;

c. commanding the vehicle to travel in the selected direction and at the selected speed when one of the first and second control handles is in the non-neutral position and the other of the first and second control handles is in the neutral position; and d. driving the vehicle to a stopped state when both the first and the second control handles are in the non-neutral position.

8. The method as defined in claim 7, wherein step b further comprises:

monitoring an actual speed and an actual direction of travel of the vehicle;

comparing the selected direction of each non-neutral command signal to the actual direction of travel;

categorizing requests to travel in the actual direction of travel or from a stopped state as a drive request to continue motion in the selected direction; and categorizing requests to travel in the direction opposite to the direction of travel as a plug request to slow the material handling vehicle.

9. The method as defined in claim 8, wherein step d further comprises the steps of:

determining whether the request from each of the first and second control handles is a plug request or a drive request; and slowing the vehicle to a stopped state when either of the first and second control handles is producing a plug request.

10. The method as defined in claim 9, wherein step d further comprises the step of driving the material handling vehicle at the slower of the speed requests from the first and the second control handles when both of the first and second control handles are providing a drive request.

11. The method as defined in claim 9, wherein step d further comprises the step of delaying until both the first and second control handles are returned to a neutral position before commanding the vehicle to move based on input from either of the first and the second control handles.

12. The method as defined in claim 10 wherein step d comprises slowing the vehicle to a stop when one of the first and second handles providing a drive command is returned to a neutral position.

13. A method for resolving conflicting inputs from each of a first and a second control handle in a material handling vehicle, the method comprising the following steps:

a. monitoring a first input command from the first control handle for a first speed and a first direction of travel command signal;

b. monitoring a second input command signal from the second control handle for a second speed and a second direction of travel command signal;

c. monitoring the actual direction of motion and actual speed of the vehicle;

d. comparing each of the first and second command signals to a neutral position and to the actual direction of motion to determine whether each of the first and second command signals is a drive request, a plug request, or a neutral request; and e. when one of the first and second control signals is a neutral request and the other is a drive request or a plug request, commanding the material handling vehicle to follow the command of the other control handle;

f. when each of the first and the second control signals is a drive request, commanding the material handling vehicle to drive at the lower of the first and second speed commands until either of the control signals is changed to a plug request or a neutral request and then coasting the vehicle to a stopped state;

g. when neither of the first and second signals is a neutral request and at least one of the first and second control signals is a plug request, commanding the material handling vehicle to slow to the stopped state.

14. The method as defined in claim 13, wherein step g, further comprises the steps of:

i) slowing the vehicle at a predetermined deceleration rate when one of the first and second control signals is a plug request and the other is a drive request; and ii) slowing the vehicle at the faster of the first and second plug request deceleration rates when both of the first and second control signals are a plug request.

15. The method as defined in claim 13, further comprising the step of:

h. commanding the vehicle to remain in the stopped state until the first and second control signals are each in the neutral state.

16. The method as defined in claim 13, wherein step g comprises:

i) commanding the vehicle to remain in the stopped state until at least one of the first and second handles is returned to the neutral state; and ii) commanding the vehicle to move at the speed and in the direction selected by the control handle returned to the neutral state when the handle is moved out of the neutral state to provide a drive request.

17. The method as defined in claim 16, wherein step (ii) comprises the step of limiting the speed of the vehicle to a pre-selected maximum.

18. The method as defined in claim 13, wherein step g further comprises comparing the actual speed of the vehicle to zero and entering the stopped state when the actual speed is substantially equivalent to zero.

19. A method for controlling a lift truck having a first control handle facing the fore direction and a second control handle facing the aft direction, the method comprising the following steps:

a. monitoring a first travel request signal from the first control handle providing a first speed and a first direction of travel control signal;

b. monitoring a second travel request signal from the second control handle providing a second speed and a second direction of travel control signal;

c. comparing each of the first and second travel request signals to a neutral request signal associated with a neutral control handle position and determining whether each of the first and second travel request signals is a neutral request signal or a non-neutral request signal; and d. when one of the first and second travel request signals is a neutral request signal and the other is a non-neutral request signal, operating the lift truck in a normal mode wherein the lift truck follows the non-neutral request signal;

e. when neither of the first and second control signals is a neutral control signal, operating the lift truck in a conflict mode wherein the lift truck is controlled to a stopped state; and f. after the lift truck is in the conflict mode, allowing the lift truck to enter the normal mode of operation only if both of the first and second control signals are returned to a neutral request signal while the vehicle is in the stopped state.

20. The method as defined in claim 19, wherein step c further comprises the steps of:

monitoring an actual direction of motion of the vehicle;

comparing the direction of the each non-neutral travel request signal to the actual direction of motion; and categorizing the travel request as a plug request when the direction of the travel request is the opposite of the actual direction of travel of the vehicle and as a drive request when the direction of the travel request is in the same direction as the actual direction of the vehicle.

21. The method as defined in claim 20, wherein step e further comprises the step of slowing the vehicle at the higher of the first and second speed requests when each of the first and second travel requests is a plug request.

22. The method as defined in claim 20, wherein step e further comprises the step of slowing the vehicle at a pre-defined deceleration rate when one of the first and second travel requests is a drive request and the other of the first and second travel requests is a plug request.

23. The method as defined in claim 20, wherein step f further comprises the steps of monitoring the first and second travel requests to determine if one has returned to the neutral position;

commanding the vehicle to drive at a limited pre-selected maximum speed in the direction selected by the travel request that had returned to a neutral request when the travel request moves to a non-neutral position.

24. The method as defined in claim 20, wherein step e further comprises the step of driving the vehicle at the lower of the first and second speed requests when each of the first and second travel requests is a drive request.

25. The method as defined in claim 24, further comprising the step of commanding the vehicle to coast to a stop when either of the first and second travel requests is changed to either a neutral request or a plug request.

* * * * *